US012615124B2

(12) United States Patent
Yang et al.

(10) Patent No.: US 12,615,124 B2
(45) Date of Patent: Apr. 28, 2026

(54) DATA TRANSMISSION METHOD, DATA TRANSMISSION APPARATUS AND DATA TRANSMISSION DEVICE

(71) Applicant: DATANG MOBILE COMMUNICATIONS EQUIPMENT CO., LTD., Beijing (CN)

(72) Inventors: Xianjun Yang, Beijing (CN); Shiqiang Suo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 454 days.

(21) Appl. No.: 18/036,577

(22) PCT Filed: Nov. 3, 2021

(86) PCT No.: PCT/CN2021/128386
§ 371 (c)(1),
(2) Date: May 11, 2023

(87) PCT Pub. No.: WO2022/100493
PCT Pub. Date: May 19, 2022

(65) Prior Publication Data
US 2024/0014981 A1     Jan. 11, 2024

(30) Foreign Application Priority Data

Nov. 12, 2020    (CN) .......................... 202011261728.1

(51) Int. Cl.
*H04L 5/00*      (2006.01)
*G06N 20/00*     (2019.01)

(52) U.S. Cl.
CPC .......... *H04L 5/0055* (2013.01); *G06N 20/00* (2019.01)

(58) Field of Classification Search
CPC ... H04L 5/0055; H04L 1/1854; H04L 1/1861; G06N 20/00; G06N 3/096; G06N 3/0455; G06N 3/045
See application file for complete search history.

(56) References Cited

U.S. PATENT DOCUMENTS 10,732,902 B1 * 8/2020 Lazier ................. G06F 16/2228
10,764,004 B2 * 9/2020 Lyu ........................ H04W 72/23
(Continued)

FOREIGN PATENT DOCUMENTS

CA     3062808 A1 * 11/2019 .......... H04L 5/0094
CN     103095432 A    5/2013
(Continued)

OTHER PUBLICATIONS

International Search Report for PCT/CN2021/128386 issued on Dec. 27, 2021 and its English Translation provided by WIPO.
(Continued)

*Primary Examiner* — Michael A Keller
(74) *Attorney, Agent, or Firm* — Ladas & Parry, LLP

(57) ABSTRACT
A data transmission method, a data transmission apparatus, and a data transmission device are provided, where the method on the terminal side includes: obtaining, by the terminal, an ACK/NACK sequence to be fed back; selecting, by the terminal, a machine learning model applied to the ACK/NACK sequence; compressing, by the terminal, the ACK/NACK sequence through the machine learning model to obtain an indication sequence; and transmitting, by the terminal, the indication sequence to the network device.

20 Claims, 3 Drawing Sheets

(56)  References Cited

U.S. PATENT DOCUMENTS

| | | | | |
|---|---|---|---|---|
| 10,764,015 B2 * | 9/2020 | Guan | H04L 5/1469 |
| 10,911,175 B2 * | 2/2021 | Zheng | H04W 72/12 |
| 10,917,199 B2 * | 2/2021 | Sun | H04W 72/0446 |
| 11,290,217 B2 * | 3/2022 | Gao | H04L 1/1812 |
| 11,533,202 B2 * | 12/2022 | Chen | H04W 72/0446 |
| 11,646,771 B2 * | 5/2023 | Li | H04W 72/1273 370/329 |
| 11,736,237 B2 * | 8/2023 | Gao | H04L 1/1812 370/329 |
| 11,737,085 B2 * | 8/2023 | Lou | H04W 72/23 370/329 |
| 11,764,933 B2 * | 9/2023 | Chen | H04L 5/0055 370/329 |
| 12,328,709 B2 * | 6/2025 | Zhao | H04W 72/02 |
| 12,362,862 B2 * | 7/2025 | Ma | H04L 1/16 |
| 12,476,740 B2 * | 11/2025 | Gao | H04L 1/1607 |
| 2009/0225700 A1 | 9/2009 | Shen et al. | |
| 2011/0246840 A1 * | 10/2011 | Khoshnevis | H04L 1/0073 714/799 |
| 2013/0114474 A1 | 5/2013 | Fu et al. | |
| 2017/0117991 A1 | 4/2017 | Liu et al. | |
| 2018/0026649 A1 | 1/2018 | Harik | |
| 2019/0081764 A1 * | 3/2019 | Guan | H04L 1/16 |
| 2019/0238275 A1 * | 8/2019 | Sun | H04W 72/0446 |
| 2020/0178285 A1 * | 6/2020 | Sun | H04L 1/1812 |
| 2020/0351850 A1 * | 11/2020 | Chen | H04W 72/21 |
| 2021/0014023 A1 * | 1/2021 | Zheng | H04L 5/0044 |
| 2021/0091893 A1 * | 3/2021 | Ma | H04L 1/1671 |
| 2021/0159948 A1 * | 5/2021 | Li | H04L 1/1896 |
| 2021/0167901 A1 * | 6/2021 | Tang | H04W 72/0446 |
| 2021/0218537 A1 * | 7/2021 | Chen | H04L 5/0044 |
| 2021/0314094 A1 * | 10/2021 | Gao | H04L 1/1812 |
| 2022/0094479 A1 * | 3/2022 | Gao | H04L 5/0057 |
| 2022/0116916 A1 * | 4/2022 | Zhao | H04L 1/1854 |
| 2022/0140958 A1 * | 5/2022 | Zhou | H04W 72/20 370/329 |
| 2023/0254873 A1 * | 8/2023 | Li | H04W 72/1273 |
| 2023/0361931 A1 * | 11/2023 | Yang | H04L 5/0053 |
| 2023/0388150 A1 * | 11/2023 | Maluf | G06F 18/24155 |
| 2024/0032044 A1 * | 1/2024 | Su | H04L 1/1861 |
| 2025/0254663 A1 * | 8/2025 | Zhao | H04L 1/1822 |

FOREIGN PATENT DOCUMENTS

| | | | | |
|---|---|---|---|---|
| CN | 105187157 A | | 12/2015 | |
| CN | 107534527 A | | 1/2018 | |
| CN | 108683901 A | | 10/2018 | |
| CN | 111079948 A | | 4/2020 | |
| CN | 110505040 B | * | 5/2020 | H04L 5/0055 |
| CN | 112534910 A | * | 3/2021 | H04L 1/1854 |
| CN | 109156035 B | * | 5/2021 | H04W 74/006 |
| CN | 113544987 A | * | 10/2021 | H04L 1/1864 |
| CN | 111566961 B | * | 5/2022 | H04W 72/56 |
| CN | 114867117 A | * | 8/2022 | H04W 72/56 |
| CN | 114867117 B | * | 1/2024 | H04L 1/1812 |
| CN | 109600210 B | * | 7/2024 | H04W 72/231 |
| CN | 111800232 B | * | 12/2024 | H04L 5/0055 |
| CN | 115118403 B | * | 12/2024 | H04W 72/0446 |
| CN | 116097597 B | * | 12/2024 | H04L 1/1887 |
| CN | 114208362 B | * | 9/2025 | H04W 72/23 |
| EP | 3493437 A1 | * | 6/2019 | H04W 72/23 |
| EP | 3499770 A1 | * | 6/2019 | H04L 1/1664 |
| EP | 3598709 A1 | * | 1/2020 | H04L 1/1822 |
| EP | 3447953 B1 | * | 7/2020 | H04L 1/1854 |
| EP | 3761601 A1 | * | 1/2021 | H04L 5/0053 |
| EP | 3780445 A1 | * | 2/2021 | H04L 1/189 |
| EP | 3796583 A1 | * | 3/2021 | H04W 72/21 |
| EP | 3817261 A1 | * | 5/2021 | H04L 5/0055 |
| EP | 3833128 A1 | * | 6/2021 | H04W 72/21 |
| EP | 3855650 A1 | * | 7/2021 | H04W 72/23 |
| EP | 3905569 A1 | * | 11/2021 | H04W 72/23 |
| EP | 3908059 A1 | * | 11/2021 | H04W 72/23 |
| EP | 3927065 A1 | * | 12/2021 | H04W 72/23 |
| EP | 3598709 B1 | * | 5/2022 | H04W 72/21 |
| EP | 4012957 A1 | * | 6/2022 | H04L 1/1864 |
| EP | 4120609 A1 | * | 1/2023 | H04L 1/18 |
| EP | 3780445 B1 | * | 3/2023 | H04L 5/00 |
| EP | 4199625 A1 | * | 6/2023 | H04L 5/0053 |
| EP | 3735071 B1 | * | 7/2023 | H04L 5/0044 |
| EP | 4213429 A1 | * | 7/2023 | H04L 5/00 |
| EP | 3833128 B1 | * | 8/2023 | H04L 1/1854 |
| EP | 3817261 B1 | * | 11/2023 | H04L 1/1812 |
| EP | 4271102 A1 | * | 11/2023 | H04L 1/1812 |
| EP | 4398507 A2 | * | 7/2024 | H04L 1/1812 |
| EP | 4560962 A1 | * | 5/2025 | H04L 1/1822 |
| EP | 4271102 B1 | * | 9/2025 | H04L 5/0053 |
| EP | 3855650 B1 | * | 10/2025 | H04W 72/23 |
| EP | 3783827 B1 | * | 12/2025 | H04W 72/56 |
| ES | 2966708 T3 | * | 4/2024 | H04L 1/1812 |
| JP | 7143447 B2 | * | 9/2022 | H04W 72/21 |
| JP | 7178368 B2 | * | 11/2022 | H04B 7/024 |
| JP | 7229362 B2 | * | 2/2023 | H04W 72/25 |
| JP | 7232903 B2 | * | 3/2023 | H04B 7/0486 |
| JP | 2023058691 A | * | 4/2023 | H04B 7/0486 |
| JP | 2025003473 A | * | 1/2025 | H04W 72/542 |
| JP | 7627750 B2 | * | 2/2025 | H04W 72/1273 |
| KR | 20210104860 A | * | 8/2021 | H04W 72/23 |
| KR | 20220100788 A | * | 7/2022 | H04W 72/23 |
| KR | 20230070278 A | * | 5/2023 | H04W 72/232 |
| KR | 20230098724 A | * | 7/2023 | H04L 1/1812 |
| KR | 20230109794 A | * | 7/2023 | H04L 1/1854 |
| KR | 102687984 B1 | * | 7/2024 | H04W 72/23 |
| KR | 102712002 B1 | * | 9/2024 | H04W 72/0446 |
| WO | WO-2018027997 A1 | * | 2/2018 | H04W 72/04 |
| WO | WO-2018126415 A1 | * | 7/2018 | H04W 8/22 |
| WO | WO-2019184595 A1 | * | 10/2019 | H04L 5/0055 |
| WO | WO-2019184943 A1 | * | 10/2019 | H04W 72/23 |
| WO | WO-2019191971 A1 | * | 10/2019 | H04L 5/0051 |
| WO | WO-2020034223 A1 | * | 2/2020 | H04L 1/1854 |
| WO | 2020068498 A1 | | 4/2020 | |
| WO | WO-2020133504 A1 | * | 7/2020 | H04W 72/23 |
| WO | WO-2020140965 A1 | * | 7/2020 | H04W 72/23 |
| WO | WO-2020164358 A1 | * | 8/2020 | H04W 72/23 |
| WO | WO-2020164503 A1 | * | 8/2020 | H04W 72/23 |
| WO | WO-2021204257 A1 | * | 10/2021 | H04W 72/56 |
| WO | WO-2022027605 A1 | * | 2/2022 | H04L 5/0055 |
| WO | WO-2022205103 A1 | * | 10/2022 | H04L 1/1887 |

OTHER PUBLICATIONS

Written Opinion for PCT/CN2021/128386 issued on Dec. 27, 2021 and its English Translation provided by WIPO.

International Preliminary Report on Patentibily for PCT/CN2021/128386 issued on May 16, 2023 and its English translation provided by WIPO.

First Chinese Office Action and search report for the corresponding Chinese Patent Application No. 202011261728.1 issued by the Chinese Patent Office on Jul. 20, 2023 and its English translation provided by the applicant's foreign counsel.

Extended European Search Report for European Patent Application No. 21891020.6 issued by the European Patent Office on Apr. 3, 2024.

Second Chinese Office Action and search report for Chinese Patent Application No. 202011261728.1 issued by the Chinese Patent Office on Mar. 28, 2024 and its English translation provided by the foreign associate.

Written Opinion (corrected version) for PCT/CN2021/128386 issued on Dec. 27, 2021 and its English Translation provided by WIPO.

First Chinese Office Action and search report for Chinese Patent Application No. 202011261728.1 issued by the Chinese Patent Office on Jul. 20, 2023 and its English translation provided by Chinese Patent Office.

* cited by examiner

DATA TRANSMISSION METHOD, DATA TRANSMISSION APPARATUS AND DATA TRANSMISSION DEVICE

CROSS-REFERENCE TO RELATED APPLICATIONS

The present application is the U.S. national phase of PCT Application PCT/CN2021/128386 filed on Nov. 3, 2021, which claims claims priority to Chinese patent application No. 202011261728.1 filed on Nov. 12, 2020, the disclosures of which are incorporated herein by reference in their entireties.

TECHNICAL FIELD

The present disclosure relates to the field of communication technology, in particular to a data transmission method, a data transmission apparatus, and a data transmission device.

BACKGROUND

In the sixth generation (6th Generation, 6G) ultra-large-scale machine communication, the machine density that the network can support reaches 10 machines per square meter or 100 machines per cubic meter, and the above-mentioned machines usually only transmit some smaller data packets sporadically, adopting the scheduling-based communication method in the related art will lead to a large access signaling overhead, while the contention-based scheduling-free communication may reduce the access signaling overhead. However, in such ultra-large-scale contention-based machine communication, if the physical uplink shared channel (PUSCH) uses bitmap (bitmap) acknowledgment/negative acknowledgment (Acknowledgment/Negative Acknowledgment, ACK/NACK) mechanism or ACK/NACK plus a user equipment (user equipment, UE) identifier (identifier, ID), this method will result in a large downlink feedback overhead. In addition, if the 5th Generation (5G) ACK/NACK feedback mechanism continues to be used for the 6G physical downlink shared channel (PDSCH), it will result in a large uplink feedback overhead.

The ACK/NACK feedback method for PUSCH in the related art includes:

corresponding, by the base station, each UE ID to an ACK/NACK-Inactive bit, that is, the bitmap method. Specifically, 1 may be used to represent ACK, 0 may be used to represent NACK or the terminal in an inactive state; and then the base station broadcasts this long ACK/NACK-Inactive sequence to the terminal;

in a case that the base station feeds back the ACK/NACK bit, the base station simultaneously sends and receives the UE ID of the ACK/NACK bit;

In LTE, the base station uses the Physical Hybrid ARQ Indicator Channel (PHICH) to transmit ACK/NACK bits, and the corresponding relationship is related to the uplink resource allocated by the user;

In 5G New Radio (NR) and Narrow Band Internet of Things (NB-IoT), the base station notifies the terminal of retransmission or new transmission by whether a new data indicator (New Data Indicator, NDI) in a physical downlink control channel (physical downlink control channel, PDCCH) is reversed.

The disadvantages of the ACK/NACK feedback method for PUSCH in the related art are as follows.

in a case that 6G ultra-large-scale machine communication is applied, the method based on bitmap will cause a large signaling overhead due to the large number of users; the feedback method of ACK/NACK bit+UE ID, in a case that 6G ultra-large-scale machine communication is applied, due to the large number of users, it still has a large signaling overhead; the ACK/NACK feedback method that relies on the uplink resources allocated by the base station is not suitable for 6G contention-based ultra-large-scale machine communication; the method based on NDI flipping is only applicable to scheduling-based data transmission, and is not suitable for 6G contention-based ultra-large-scale machine communication.

The ACK/NACK feedback method for PDSCH in 5G NR in the related art is:

1) putting, based on the hybrid automatic repeat request (HARQ)-ACK codebook, the ACK/NACK of different serving cells and different time slots into one codebook, and transmitting the ACK/NACK of different serving cells and different time slots to the base station together. Specifically, the HARQ-ACK codebook is divided into a semi-static codebook and a dynamic codebook;

A) the semi-static codebook determines the codebook based on the semi-static configuration, which can avoid the situation where the base station and the UE have inconsistent understanding of the codebook size caused by missing DCI detection, and ensure the reliability of the feedback;

B) the dynamic codebook is fed back based on the quantity of actually scheduled PDSCHs, which can reduce the number of redundant bits fed back.

In addition, in order to reduce the size of the HARQ-ACK codebook, NR supports spatial combination, that is, the HARQ-ACK feedback bits of different transport blocks (transport block, TB) of the same PDSCH are combined through the "AND" operation, thereby obtaining less the number of feedback bits.

The disadvantages of ACK/NACK codebook sequences for different PDSCHs in 5G NR in the related art are as follows.

In 6G, the quantity of PDSCHs per unit time increases, and the length of the above-mentioned ACK/NACK codebook sequences become very large, that is to say, the overheads become very large, however, the methods of using dynamic codebooks and space combination in NR in the related art cannot effectively reduce the signaling overhead thereof.

SUMMARY

Embodiments of the present disclosure provide a data transmission method, a data transmission apparatus, and a data transmission device. The overhead of ACK/NACK feedback may be reduced.

In order to solve the above-mentioned technical problems, embodiments of the present disclosure provide the following technical solutions.

a data transmission method, applied to a terminal, the method includes:

obtaining, by the terminal, ACK/NACK sequence to be fed back;

selecting, by the terminal, a machine learning model applied to the ACK/NACK sequence;

compressing, by the terminal, the ACK/NACK sequence through the machine learning model to obtain an indication sequence; and transmitting, by the terminal, the indication sequence to a network device.

Optionally, the selecting, by the terminal, the machine learning model applied to the ACK/NACK sequence includes:

selecting, by the terminal, the machine learning model applied to the ACK/NACK sequence according to machine learning model indication information of the network device.

Optionally, the selecting, by the terminal, the machine learning model applied to the ACK/NACK sequence includes:

selecting, by the terminal, the machine learning model applied to the ACK/NACK sequence according to the ACK/NACK sequence.

Optionally, the data transmission method further includes: transmitting, by the terminal, indication information of the selected machine learning model applied to the ACK/NACK sequence to the network device.

Optionally, the transmitting, by the terminal, the indication sequence to the network device includes:

transmitting, by the terminal, the indication sequence to the network device on an uplink control channel or an uplink shared channel.

Optionally, the data transmission method further includes: transmitting, by the terminal, the indication sequence and indication information of the machine learning model corresponding to the indication sequence to the network device together on an uplink shared channel or an uplink control channel.

Optionally, the data transmission method further includes: transmitting, by the terminal, the indication sequence and indication information of the machine learning model corresponding to the indication sequence to the network device on an uplink shared channel and an uplink control channel respectively, or on the uplink control channel and the uplink shared channel respectively.

Optionally, the data transmission method further includes: receiving, by the terminal, machine learning model indication information transmitted by the network device through radio resource control (radio resource control, RRC) signaling or medium access control control element (medium access control control element, MAC CE) signaling or physical layer signaling.

Optionally, the machine learning model indication information is transmitted by one or all of the network devices.

Optionally, the machine learning model is trained and distributed by the following process:

obtaining, by the terminal, the ACK/NACK sequence to be fed back;

storing, by the terminal, the ACK/NACK sequence;

grouping, by the terminal, the stored ACK/NACK sequence, performing machine learning model training, generating a plurality of groups of machine learning models, and reporting the plurality of groups of machine learning models to the network device.

Optionally, the reporting, by the terminal, the trained model to the network device through the following process:

reporting, by the terminal, the trained machine learning model to the network device through RRC signaling or MAC CE or physical layer signaling.

An embodiment of the present disclosure also provides a training and distributing method of machine learning model, which is applied to a network device side, and the method includes:

obtaining, by the network device, ACK/NACK sequence to be trained, and storing the ACK/NACK sequence to be trained;

grouping, by the network device, the stored ACK/NACK sequence, performing machine learning model training, and generating a plurality of groups of machine learning models;

storing, by the network device, the machine learning models;

distributing, by the network device, the stored machine learning models to the terminals through RRC signaling or MAC CE or physical layer signaling.

Optionally, the training process and distributing process for the machine learning model further include:

being performed by one or all of the network devices; and being repeated once every fixed cycle.

Optionally, the training and distributing method of the machine learning model further includes:

storing, by the network device, the machine learning model reported by the terminal;

distributing, by the network device, the stored machine learning models of all different terminals to the terminals through RRC signaling or MAC CE or physical layer signaling. Optionally, the stored ACK/NACK sequence is grouped according to a sequence length and an ACK ratio.

An embodiment of the present disclosure also provides a data transmission method, which is applied to a network device, the method includes:

obtaining, by the network device, ACK/NACK sequence to be fed back;

selecting, by the network device, a machine learning model applied to the ACK/NACK sequence, and transmitting indication information of the selected machine learning model to the terminal;

compressing, by the network device, the ACK/NACK sequence through the machine learning model to obtain an indication sequence; and transmitting, by the network device, the indication sequence to the terminal.

Optionally, the data transmission method further includes: transmitting, by the network device, machine learning model indication information to the terminal through radio resource control (RRC) signaling or medium access control control element (MAC CE) signaling or physical layer signaling.

Optionally, the machine learning model is trained and distributed by the following process:

obtaining, by the network device, the ACK/NACK sequence to be fed back;

storing, by the network device, the ACK/NACK sequence;

grouping, by the network device, the stored ACK/NACK sequence, performing machine learning model training, and generating a plurality of groups of machine learning models;

storing, by the network device, the machine learning models;

distributing, by the network device, the stored training machine learning models to the terminals through RRC signaling or MAC CE or physical layer signaling.

Optionally, the machine learning model training process and distributing process further include: being repeated once every fixed cycle.

Optionally, the stored ACK/NACK sequence is grouped according to a sequence length and an ACK ratio.

Optionally, the data transmission method further includes:

transmitting, by the network device, the indication sequence and indication information of the machine learning model corresponding to the indication sequence to the terminal together on a downlink shared channel or a downlink control channel; or, transmitting, by the network device, the indication sequence and indication information of the machine learning model corresponding to the indication sequence to the terminal on the downlink shared channel and the downlink control channel respectively, or on the downlink control channel and the downlink shared channel respectively.

An embodiment of the present disclosure also provides a data transmission device, including: a transceiver, a processor, and a memory, where a program executable by the processor is stored in the memory; and the program, when executed by the processor, implements: obtaining ACK/NACK sequence to be fed back; selecting a machine learning model applied to the ACK/NACK sequence; compressing, through the machine learning model, the ACK/NACK sequence to obtain an indication sequence; and transmitting the indication sequence to the network device.

Optionally, the processor obtains the ACK/NACK sequence to be fed back; the memory stores the ACK/NACK sequence; the processor groups the stored ACK/NACK sequence, performs machine learning model training, and generates a plurality of groups of machine learning models, and the transceiver reports the plurality of groups of machine learning models to the network device.

An embodiment of the present disclosure also provides a data transmission apparatus, which includes:

a transceiver module, configured to obtain ACK/NACK sequence to be fed back;

a processing module, configured to select a machine learning model applied to the ACK/NACK sequence; compress, through the machine learning model, the ACK/NACK sequence to obtain an indication sequence;

where the transceiver module is further configured to transmit the indication sequence to the network device.

Optionally, the processing module is further configured to obtain the ACK/NACK sequence to be trained;

the apparatus further includes:

a storage module, configured to store the ACK/NACK sequence indicating whether downlink data is received correctly;

where the processing module is further configured to group the stored ACK/NACK sequence, perform machine learning model training, and generate a plurality of groups of machine learning models;

the transceiver module is further configured to report the machine learning models obtained by training to the network device.

An embodiment of the present disclosure also provides a data transmission device, including: a transceiver, a processor, and a memory, where a program executable by the processor is stored in the memory; the program, when executed by the process, implements: obtaining ACK/NACK sequence to be fed back; selecting a machine learning model applied to the ACK/NACK sequence, and transmitting indication information of the selected machine learning model to the terminal; compressing, through the machine learning model, the ACK/NACK sequence to obtain an indication sequence; and transmitting the indication sequence to the terminal.

Optionally, the processor obtains the ACK/NACK sequence to be trained; the memory stores the ACK/NACK sequence; the processor groups the stored ACK/NACK sequence, performs machine learning model training, and generates a plurality of groups of machine learning models; the memory stores the machine learning models; the transceiver distributes the stored training machine learning models to the terminals through RRC signaling or MAC CE or physical layer signaling.

An embodiment of the present disclosure also provides a data transmission apparatus, which includes:

a transceiver module, configured to obtain ACK/NACK sequence to be fed back;

a processing module, configured to select a machine learning model applied to the ACK/NACK sequence;

where the transceiver module is further configured to transmit indication information of the selected machine learning model to the terminal;

the processing module is further configured to compress, through the machine learning model, the ACK/NACK sequence to obtain an indication sequence;

the transceiver module is further configured to transmit the indication sequence to the terminal.

Optionally, the processing module is further configured to obtain the ACK/NACK sequence to be fed back;

the apparatus further includes:

a storage module, configured to store the ACK/NACK sequence;

where the processing module is further configured to group the stored ACK/NACK sequence, perform machine learning model training, and generate a plurality of groups of machine learning models;

the storage module is further configured to store the machine learning models;

the transceiver module is further configured to distribute the stored training machine learning models to the terminals through RRC signaling or MAC CE or physical layer signaling.

An embodiment of the present disclosure also provides a network device, including: a transceiver, a processor, and a memory, where a program executable by the processor is stored in the memory; the program, when executed by the processor, implements: obtaining ACK/NACK sequence to be trained, and storing the ACK/NACK sequence to be trained; grouping the stored ACK/NACK sequence, performing machine learning model training, and generating a plurality of groups of machine learning models; storing the machine learning models; and distributing the stored machine learning models to the terminals through RRC signaling or MAC CE or physical layer signaling.

An embodiment of the present disclosure also provides a training and distributing apparatus of machine learning model, which is applied to a network device side, the apparatus includes:

a transceiver module, configured to obtain ACK/NACK sequence to be trained, and store the ACK/NACK sequence to be trained;

a processing module, configured to group the stored ACK/NACK sequence, perform machine learning model training, and generate a plurality of groups of machine learning models;

a storage module, configured to store the machine learning models;

where the transceiver module is configured to distribute the stored machine learning models to the terminals through RRC signaling or MAC CE or physical layer signaling.

An embodiment of the present disclosure also provides a data transmission system, which includes the above-mentioned device.

An embodiment of the present disclosure also provides a processor-readable storage medium, the processor-readable storage medium stores processor-executable instructions, and the processor-executable instructions are used to enable the processor to perform the above-mentioned steps of the method.

The beneficial effects of the embodiments in the present disclosure are as follows.

In the above-mentioned embodiments of the present disclosure, the terminal obtains the ACK/NACK sequence to be fed back, specifically, the terminal receives the downlink data transmitted by at least one network device in the same and/or different time slots; the terminal receives and processes the downlink data, determines whether the downlink data is received correctly, and uses 0/1 bit sequence for representation; the terminal selects, autonomously or based on the machine learning model indication information of the network device, the machine learning model applied to the bit sequence; the terminal compresses the 0/1 bit sequence through the machine learning model to obtain an indication sequence; the terminal transmits the indication sequence to the network device. The network device receives uplink data transmitted by at least one terminal; receives and processes the uplink data, determines whether the uplink data is received correctly, and uses 0/1 bit sequence for representation; autonomously selects the trained machine learning model corresponding to the bit sequence, and transmits the indication information of the selected machine learning model to the terminal; compresses the 0/1 bit sequence through the machine learning model to obtain an indication sequence; and transmits the indication sequence to the terminal. By the machine learning, the feedback overhead of 0/1 bit sequence with the sparsity is reduced (the sparsity here means that there are only a few 0s or a few is in the 0/1 sequence). In addition, the method for compressing, transmitting and decompressing the ACK/NACK sequence with the sparsity in the present disclosure is also applicable to other 0/1 bit sequences with the sparsity generated during communication.

DETAILED DESCRIPTION

Figure 1:
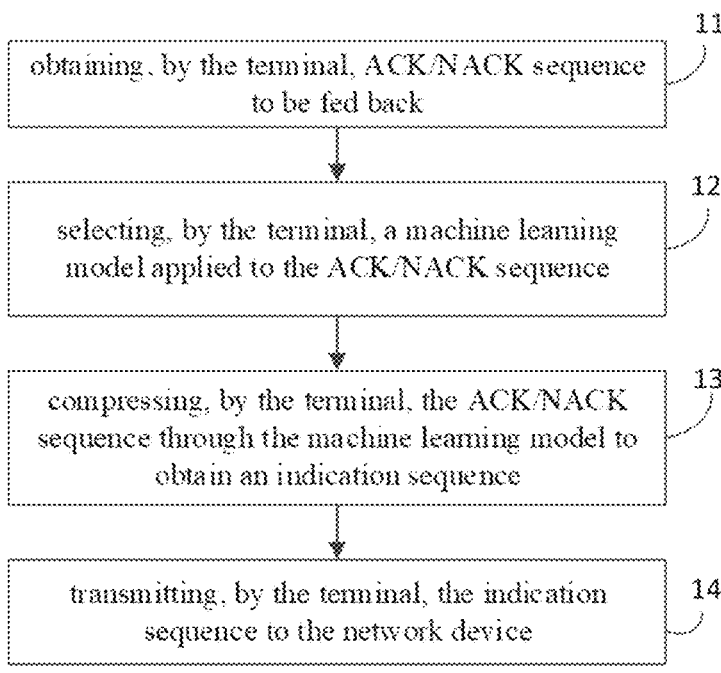
FIG. 1 is a flowchart of a data transmission method on a terminal side in the present disclosure.

Exemplary embodiments of the present disclosure will be described in more detail below with reference to the drawings. Although exemplary embodiments of the present disclosure are shown in the drawings, it should be understood that the present disclosure may be embodied in various forms and should not be limited by the embodiments set forth herein. Conversely, these embodiments are provided for more thorough understanding of the present disclosure and to fully convey the scope of the present disclosure to those skilled in the art.

As shown in FIG. 1, an embodiment of the present disclosure provides a data transmission method, applied to a terminal, and the method includes:

Step 11, obtaining, by the terminal, the ACK/NACK sequence to be fed back; in an optional embodiment, the terminal receives the downlink data transmitted by at least one network device in the same and/or different time slots; the terminal receives and processes the downlink data, determines whether the downlink data is received correctly, and uses a 0/1 bit sequence for representation;

Step 12, selecting, by the terminal, the machine learning model applied to the ACK/NACK sequence; here, the terminal may select the machine learning model applied to the ACK/NACK sequence according to the machine learning model indication information of the network device; the terminal may also autonomously select the machine learning model applied to the ACK/NACK sequence;

Step 13, compressing, by the terminal, the ACK/NACK sequence through the machine learning model to obtain an indication sequence;

Step 14, transmitting, by the terminal, the indication sequence to the network device.

In this embodiment of the present disclosure, respective bits in the ACK/NACK sequence correspond to data blocks transmitted by a base station, which may be data blocks divided in a predetermined manner on different time slots, different channels, and the same channel and combinations thereof; in this embodiment, the terminal receives the downlink data transmitted by at least one network device in the same and/or different time slots; receives and processes the downlink data, determines whether the downlink data is received correctly, and uses a 0/1 bit sequence for representation; the terminal selects, autonomously or based on the machine learning model indication information of the network device, the machine learning model applied to the bit sequence; and compresses the 0/1 bit sequence through the machine learning model to obtain the indication sequence; the terminal transmits the indication sequence to the network device, and compresses, transmits, and decompresses the above-mentioned bit sequence with sparsity, based on deep learning technology (such as autoencoder technology), thereby reducing feedback overhead for bit sequence with sparsity.

In an optional embodiment of the present disclosure, the selecting, by the terminal, a machine learning model applied to the ACK/NACK sequence includes:

selecting, by the terminal, the machine learning model applied to the ACK/NACK sequence according to the machine learning model indication information of the network device.

In an optional embodiment of the present disclosure, the selecting, by the terminal, the machine learning model applied to the ACK/NACK sequence includes:

selecting, by the terminal, the machine learning model applied to the ACK/NACK sequence according to the ACK/NACK sequence.

In an optional embodiment of the present disclosure, the above-mentioned data transmission method may also include:

transmitting, by the terminal, the indication information of the selected machine learning model applied to the ACK/NACK sequence to the network device.

In an optional embodiment of the present disclosure, the above-mentioned data transmission method may also include:

receiving, by the terminal, machine learning model indication information transmitted by the network device through radio resource control (RRC) signaling or medium access control control element (MAC CE) signaling or physical layer signaling. The machine learning model indication information herein is transmitted by one or all of the network devices. All network devices here correspond to multiple receiving points in a coordinated multiple points (CoMP) transmission scenario.

Specifically, the machine learning model is trained and distributed by the following process:

obtaining, by the network device, the ACK/NACK sequence to be trained, optionally, the network device receives the indication sequence transmitted by the terminal; the network device decompresses the indication sequence to generate a corresponding ACK/NACK sequence, and stores the corresponding ACK/NACK sequence;

grouping, by the network device, the stored ACK/NACK sequence, performing machine learning model training, and generating a plurality of groups of machine learning models;

storing, by the network device, the machine learning models;

distributing, by the network device, the stored machine learning models to the terminals through RRC signaling or MAC CE or physical layer signaling.

The machine learning model training process and distributing process further include: being performed by one or all of the network devices; and being repeated once every fixed cycle.

Here, the network device stores the received 0/1 bit sequence to grade the sparsity of the above-mentioned 0/1 bit sequence with sparsity; for example, the ACK/NACK sequence [0,0,0,0,0,0,0,0,0,1,0,0,0,0,0,0,1,0,0,0], where 1 represents ACK and 0 represents NACK; in addition, 1 may also be used to represent NACK, 0 represents ACK, which is to reflect the sparsity of the ACK/NACK sequence. The sparsity of the bit sequence may be the ratio of the number of 1 in the bit sequence to the total number of bits in the bit sequence, the sparse value of the above-mentioned bit sequence is: $2/20=0.1$, if the sparsity level corresponding to 0.1 is 1, then it is determined that the sparsity level of the bit sequence is 1.

The Nth machine learning model is trained through the Nth level of bit sequence among the multiple of different sparse levels of bit sequences to obtain the Nth machine learning model corresponding to the Nth level of bit sequence;

The N+1th machine learning model is trained through the Nth machine learning model and the N+1th level of bit sequence to obtain the N+1th machine learning model corresponding to the N+1th level of bit sequence.

During the specific implementation, the 0/1 bit sequences with different sparsity levels generated recently according to the demodulation results are stored; the sparsity of the above-mentioned 0/1 bit sequences with sparsity are graded; the training unit selects a sparse level of 0/1 bit sequence to train the autoencoder to be used; based on a certain sparse level of autoencoder model trained above, transfer learning is performed to obtain the parameters of the autoencoder at other sparse levels, that is, in a case that the other sparse levels of autoencoder parameters are trained, the certain sparse level of machine learning model trained above is used as the starting point.

In addition, the Nth machine learning model may also be trained through the Nth level of bit sequence among the multiple of different sparse levels of bit sequences to obtain the Nth machine learning model corresponding to the Nth level of bit sequence;

the N+1th machine learning model is trained through the N+1th level of bit sequence among the multiple of different sparse levels of bit sequences to obtain the N+1th machine learning model corresponding to the N+1th level of bit sequence.

During specific implementation, the recently received decompressed 0/1 bit sequence is stored; the sparsity of the above-mentioned stored 0/1 bit sequence is graded; the training unit uses the above-mentioned different sparse levels of 0/1 bit sequences to train the machine learning apparatus to be used, and obtains machine learning models with different parameters corresponding to different sparse levels respectively.

In an optional embodiment of the present disclosure, the machine learning model may also be trained and distributed by the following process:

obtaining, by the terminal, the ACK/NACK sequence to be fed back. Optionally, the terminal receives downlink data transmitted by at least one network device in the same and/or different time slots; the terminal receives and processes the downlink data, and obtains the ACK/NACK sequence to be fed back, further, determines whether the downlink data is received correctly, and uses a 0/1 bit sequence for representation;

storing, by the terminal, the ACK/NACK sequence;

grouping, by the terminal, the stored ACK/NACK sequence, performing machine learning model training, generating a plurality of groups of machine learning models, and reporting the plurality of groups of machine learning models to the network device;

further, the network device stores the reported machine learning models;

distributing, by the network device, the stored machine learning models to the terminal through RRC signaling or MAC CE or physical layer signaling.

Further, the terminal reports the trained models to the network device through the following process:

reporting, by the terminal, the trained machine learning models to the network device through RRC signaling or MAC CE or physical layer signaling.

Here, the stored ACK/NACK sequence may be grouped, and may be grouped according to sequence length and ACK ratio.

In an optional embodiment of the present disclosure, the compressing, through a trained machine learning model corresponding to the sparse level, the ACK/NACK sequence to obtain an indication sequence includes:

performing a convolutional neural network, performing a batch normalization, and then performing an activation function and a fully connected layer on the encoder in the autoencoder of the trained machine learning model, and then limiting the coefficient and output of the autoencoder as a binary bit to obtain an indication sequence.

Here, the above ACK/NACK sequence is compressed based on the encoder in the selected autoencoder, and the coefficient and output of the autoencoder are also limited as binary 0, 1 bits to obtain a compressed M×1 binary vector [0,1,1,0,0,1,0];

The specific operation of the encoder in the autoencoder is described as follows of: performing a convolutional neural network, then performing a batch normalization, a leakyReLU activation function, and a full connected layer on the above-mentioned sparse 0/1 bit sequence, and then limiting the output value as 0 or 1, that is, obtaining the above-mentioned compressed binary sequence.

In an optional embodiment of the present disclosure, the transmitting, by the terminal, the indication sequence to the network device includes:

transmitting, by the terminal, the indication sequence and the indication information of the machine learning model corresponding to the indication sequence to the network device together on an uplink shared channel or an uplink control channel; or, transmitting, by the terminal, the indication sequence and the indication information of the machine learning model corresponding to the indication sequence to the network device on the uplink shared channel and the uplink control channel respectively, or on the uplink control channel and the uplink shared channel respectively; or, transmitting, by the terminal, only the indication sequence to the network device on the uplink control channel or uplink shared channel.

In the above-mentioned embodiments of the present disclosure, based on the deep learning technology (such as the autoencoder technology), ACK/NACK sequence compression, transmission and decompression are performed on 6G PDSCH.

Based on the embodiment described in FIG. 1 of the present disclosure, the method on the network side corresponds to the method on the terminal side, and the above-mentioned method on the terminal side is also applicable to the embodiment on the network side, and may also achieve the same technical effect.

The embodiment of the present disclosure also provides a training and distributing method of machine learning model, which is applied to a network device side, and the method includes:

obtaining, by the network device, the ACK/NACK sequence to be trained, and storing the ACK/NACK sequence to be trained;

grouping, by the network device, the stored ACK/NACK sequence, performing machine learning model training, and generating a plurality of groups of machine learning models;

storing, by the network device, the machine learning models;

distributing, by the network device, the stored machine learning models to the terminals through RRC signaling or MAC CE or physical layer signaling.

In an optional embodiment of the present disclosure, the machine learning model training process and distributing process further include:

being performed by one or all of the network devices; and being repeated every fixed cycle.

In an optional embodiment of the present disclosure, the training and distributing method of the machine learning model further includes:

storing, by the network device, the machine learning model reported by the terminal;

distributing, by the network device, the stored machine learning models of all different terminals to the terminals through RRC signaling or MAC CE or physical layer signaling.

Here, the terminal side reports the models trained by itself to the network device, and the network device summarizes the models of all other terminals, and then transmits the summarized result to the terminal.

In an optional embodiment of the present disclosure, the grouping the stored ACK/NACK sequence may be performed according to sequence length and ACK ratio.

In this embodiment of the present disclosure, through the above-mentioned training process, the network device can determine the machine learning model, thereby reducing the feedback overhead of the bit sequence with sparsity.

Figure 2:
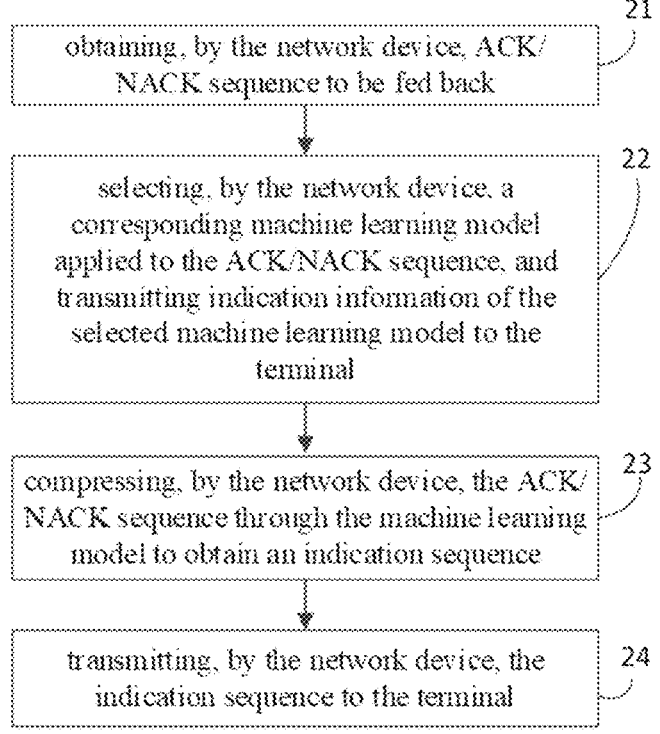
FIG. 2 is a flowchart of a data transmission method on a network side in the present disclosure.

As shown in FIG. 2, an embodiment of the present disclosure also provides a data transmission method, applied to a network device, and the method includes:

step 21, obtaining, by the network device, the ACK/NACK sequence to be fed back; in an optional implementation mode, the network device receives uplink data transmitted by at least one terminal; receives and processes the uplink data, and determines whether the uplink data is received correctly, and uses a 0/1 bit sequence for representation;

step 22, selecting, by the network device, a machine learning model applied to the corresponding ACK/NACK sequence, and transmitting indication information of the selected machine learning model to the terminal;

step 23, compressing, by the network device, the ACK/NACK sequence through the machine learning model to obtain an indication sequence;

step 24, transmitting, by the network device, the indication sequence to the terminal.

In the embodiment of the present disclosure, respective bits in the ACK/NACK sequence correspond to different terminals, and the terminals transmit on a predetermined channel, and the base station feeds back collectively; the NACK here is not only used to indicate that the data has not been successfully demodulated, but also used to indicate that the terminals are in an Inactive (inactive) state.

In this embodiment, the network device receives the uplink data transmitted by at least one terminal; the network device receives and processes the uplink data, determines whether the uplink data is received correctly, and uses a 0/1 bit sequence for representation, for example, the 0/1 bit sequence corresponding to ACK/NACK-Inactive; the network device selects the trained machine learning model corresponding to the bit sequence according to the load level (or sparse level) corresponding to the bit sequence; the network device compresses the 0/1 bit sequence through the machine learning model to obtain the indication sequence; the network device transmits the indication sequence to the terminal, and based on deep learning technology (such as autoencoder technology), compresses, transmits, and decompresses the above-mentioned bit sequence with sparsity, thereby reducing feedback overhead for bit sequence with sparsity.

In an optional embodiment of the present disclosure, the data transmission method may also include:

transmitting, by the network device, machine learning model indication information to the terminal through radio resource control RRC signaling or medium access control control element MAC CE signaling or physical layer signaling.

In an optional embodiment of the present disclosure, the machine learning model is trained and distributed by the following process:

obtaining, by the network device, the ACK/NACK sequence to be fed back, optionally, the network device receives the uplink data transmitted by the terminal; the network device receives and processes the uplink data, and obtains the ACK/NACK sequence to be fed back;

storing, by the network device, the ACK/NACK sequence;

grouping, by the network device, the stored ACK/NACK sequence, performing machine learning model training, and generating a plurality of groups of machine learning models;

storing, by the network device, the machine learning models;

distributing, by the network device, the stored training machine learning models to the terminals through RRC signaling or MAC CE or physical layer signaling.

In an optional embodiment of the present disclosure, the machine learning model training process and the distributing process further include: being repeated every fixed cycle.

In an optional embodiment of the present disclosure, the terminal reports the trained models to the network device through the following process:

reporting, by the terminal, the trained machine learning models to the network device through RRC signaling or MAC CE or physical layer signaling.

In an optional embodiment of the present disclosure, the grouping stored ACK/NACK sequence is performed according to sequence length and ACK ratio.

In an optional embodiment of the present disclosure, the transmitting the indication sequence to the terminal includes:

transmitting, by the network device, the indication sequence and the indication information of the machine learning model corresponding to the indication sequence to the terminal on the downlink shared channel or downlink control channel together; or, transmitting, by the network device, the indication sequence and the indication information of the machine learning model corresponding to the indication sequence to the terminal on the downlink shared channel and the downlink control channel respectively, or on the downlink control channel and the downlink shared channel respectively; or, transmitting, by the network device, only the indication sequence to the terminal on a downlink control channel or a downlink shared channel.

Figure 3:
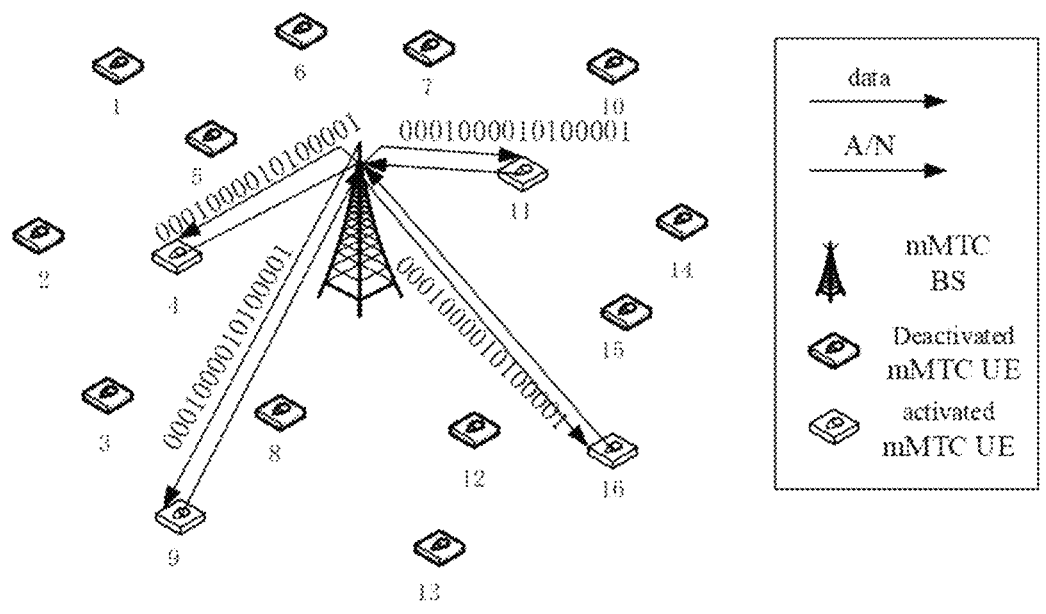
FIG. 3 is a schematic view of a PUSCH-based ACK/NACK feedback method.

In a case that the above-mentioned embodiment is specifically implemented, as shown in FIG. 3, it is a transmission schematic view of information bits of ACK/NACK-Inactive based on bit-map for 6G ultra-large-scale machine communication PUSCH. The disclosure of the transmission method of ACK/NACK-Inactive feedback based on machine learning for PUSCH, specifically includes:

1. Training
11. grading, by the base station, network loads thereof;
12. storing, by the base station, the uncompressed ACK/NACK-Inactive sequences under different load levels transmitted to the UE recently; specifically, 1 may be used to represent ACK, 0 may represent NACK or the terminal is in an inactive state;
13. using the ACK/NACK-Inactive sequences of different load levels respectively, training the machine learning apparatus to be used through the training unit of the base station, and obtaining machine learning models with different parameters corresponding to different load levels respectively.
2. storing and transferring models and parameters
21. transferring, by the training unit, the trained models and parameter sets of compressors and decompressors (or encoders, decoders) of machine learning apparatuses with different load levels to the storage unit of the base station;
22. distributing, by the base station, the stored models and parameter sets trained of the decompressors or decoders of the machine learning apparatuses with different load levels to the UE through RRC signaling or MAC CE or physical layer signaling;
23. repeating steps 2-3 of training, and steps 1-2 of storing and transferring models and parameters every fixed cycle, and updating the trained results.
3. usage
31. transmitting, by the active UE, uplink data based on contention, that is, transmitting PUSCH;
32. the base station receiving the PUSCH from an active user and demodulating the same;
33. forming, by the base station, an ACK/NACK-Inactive sequence according to the demodulation result, for example, each ACK/NACK-Inactive bit corresponds to the UE ID one by one;
34. selecting, by the base station, a model and parameter set of compressor and decompressor in a trained machine learning apparatus;
35. compressing, by the base station, the above-mentioned ACK/NACK-Inactive sequence based on the selected trained machine learning apparatus;
36. transmitting, by the base station, the subscripts of the parameter set and the model of the selected decompressor and the ACK/NACK-Inactive sequence to the UE, specifically, when sending,
A) after transmitting the subscripts of the parameter set and the model of the selected decompressor to the UE through physical layer signaling, the base station transmits the ACK/NACK-Inactive sequence to the UE in a broadcasting form;

or

B) the base station transmits the subscripts of the parameter set and the model of the selected decompressor together with the ACK/NACK-Inactive sequence to the UE in a broadcast form;
37. performing, by the active UE, a decompression based on the signaling received by the base station and/or the received compressed ACK/NACK-Inactive sequence, and obtaining ACK/NACK-Inactive bit corresponding to itself.

The above machine learning training process and the process of storing and transferring model parameters are not always bound together with the use process. The implementation process includes the following two methods.

First, once the training is completed and the model parameters are transferred, the above-mentioned model parameters may be applied repeatedly until the communication environment changes greatly and the model parameters are no longer applicable, instead of training the model before each time of using the same.

Second, the base station extracts the above-mentioned data in stages, conducts independent training offline, and then compares the trained model with the model currently in use, and selects a more suitable model for online use (when using a newly trained model, the transfer process of the model is also included).

Figure 4:
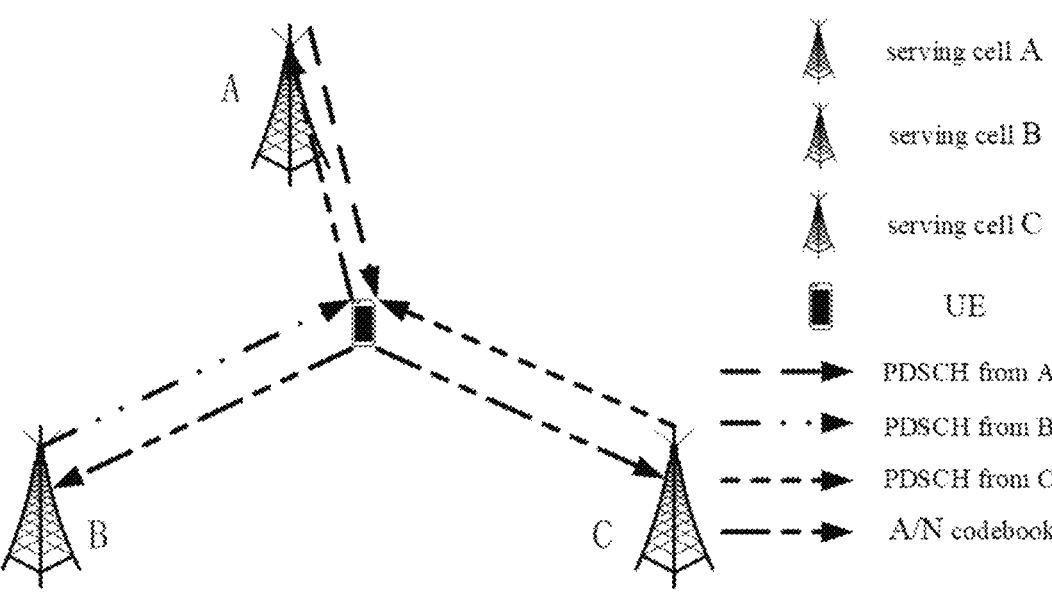
FIG. 4 is a schematic view of the PUSCH-based ACK/NACK feedback method.

As shown in FIG. 4, it is a schematic view of ACK/NACK codebook feedback for PDSCH. The disclosure of the transmission method of ACK/NACK feedback for PDSCH specifically includes:

1. training
11. storing, by the base station, the ACK/NACK sequence restored through decompression and transmitted by the UE in different channel states recently;
12. grouping the above-mentioned different channel states, and using, by the training unit, the ACK/NACK sequence transmitted by the UE in the same group of channel states to train the machine learning apparatus to be used until all channel state groups are traversed, obtaining machine learning models with different parameters corresponding to different channel states;
2. storing and transferring models and parameters
21. transferring, by the training unit, the models and parameter sets of the decompressors or decoders of the trained machine learning apparatus in the different groups of channel states to the storage unit of the base station;
22. configuring, by the base station, the stored models and parameter sets of compressors or encoders of trained machine learning apparatus to the UE through RRC signaling or MAC CE or physical layer signaling.
23. repeating steps 1-2 of training and steps 1-2 of storing and transferring models and parameters every fixed cycle; and updating the trained results.
3. usage
31. receiving and demodulating, by the UE, PDSCHs from different serving cells and/or different time slots;
32. forming, by the UE, a plurality of groups of ACK/NACK sequences corresponding to the PDSCHs including the above-mentioned different serving cells and different time slots according to the demodulation result;
33. selecting autonomously, by the UE, the models and parameter sets of the compressors and decompressors in the trained machine learning apparatus according to the channel states corresponding to different groups of ACK/NACK sequences, or compressing, by the UE, the above-mentioned ACK/NACK sequence according to the models and parameter sets of the compressors and decompressors in the machine learning apparatus indicated by the primary serving cell;
34. transmitting, by the UE, the compressed ACK/NACK sequence to the base station side; specifically:
A) the UE transmits the ACK/NACK sequence and the selected model of the decoder and the subscript of the parameter set in the trained machine learning apparatus to the base station side, such as using an uplink shared channel or an uplink control channel, or
B) the UE transmits the ACK/NACK sequence and the selected model of the decoder and the subscript of the parameter set in the trained machine learning apparatus to the base station side respectively through different channels (for example, the ACK/NACK sequence uses the uplink shared channel, and the subscript uses the uplink control channel), or
C) when the model of the decoder and parameter set in the machine learning apparatus adopted by the UE are specified by the primary serving cell, only the ACK/NACK sequence is transmitted to the base station side, and the uplink shared channel or uplink control channel may be used.
35. using, by the base station side, the primary serving cell or the machine learning apparatus notified by the UE to decompress the received compressed ACK/NACK sequence, and then obtaining the ACK/NACK sequence corresponding to the transmitted PD SCH.

In addition, training, storing and transferring parameters may also be the following steps, and the usage method is the same as the above-mentioned method, and will not be described again;
1. Training
Different UEs store uncompressed ACK/NACK sequences generated in different channel states recently;
the above-mentioned different channel states are grouped, and the training unit uses the UE in the same group of channel states to generate ACK/NACK sequences for training the machine learning apparatus to be used until the channel states of all groups are traversed, thereby obtaining machine learning models with different parameters corresponding to different channel states;
2. storing and transferring parameter models and parameters
The training unit reports the trained parameters and/or structures of the compressor or encoder of the machine learning apparatus in different groups of channel states to the base station through RRC signaling or MAC CE or physical layer signaling, after being received by the base station, they are transferred to the storage unit of the base station;
The base station configures the stored models and parameter sets of the compressors or encoders of the trained machine learning apparatus to the UE through RRC signaling or MAC CE or physical layer signaling and transmits them to the UE.
Step 1-2 of step training, and step 1-2 of storing and transferring the model and parameter are repeated, and the training result are updated at regular intervals.
The above-mentioned machine learning training process and the process of storing and transferring model parameters are not always bound together with the use process. The implementation process includes the following two methods.
Method 1: once the training is completed and the model parameters are transferred, the above-mentioned model parameters may be applied repeatedly until the communication environment changes greatly and the model parameters are no longer applicable, instead of training the model before each use.
Method 2: the base station extracts the above-mentioned data in stages, conducts independent training offline, and then compares the trained model with the model currently in use, and selects a more suitable model for online use (when using a newly trained model, the transfer process of the model is also included).
The specific implementation of above-mentioned method is illustrated in conjunction with the specific embodiment below.
Embodiment 1: Based on the autoencoder technology in machine learning, the ACK/NACK-Inactive sequence of PUSCH in 6G ultra-large-scale machine communication is compressed, wherein the autoencoder technology first uses the encoder to compress the data at the sending end, then uses the decoder to decompress the data at the receiving end, and the parameters of the encoder and the decoder are obtained based on data training through machine learning method.
1. Training
Step 1: the base station grades the network loads thereof;
Step 2: the base station stores the ACK/NACK-Inactive sequences recently transmitted to the UE at different load levels;

Step 3: the training unit selects an ACK/NACK-Inactive sequence with a network load level to train the auto-encoder to be used;

Step 4: the base station migrates the autoencoder parameters trained based on the above-mentioned load levels at other network load levels, and obtains the parameters of the machine learning apparatus at different network load levels;

2. Storing and transferring models and parameters

Step 1: the training unit transfers the models and parameter sets of the encoders and decoders in the trained autoencoders with different load levels to the storage unit of the base station;

Step 2: the base station configures the stored models and parameter sets of decoders in the trained autoencoders with different load levels to the UE through RRC signaling.

Step 3: steps 2-4 of training, step 1-2 of storing and transferring the models and parameters are repeated, and the trained results are updated every fixed cycle.

3. usage

Step 1: in 6G ultra-large-scale machine communication, each UE wakes up at intervals to monitor the environment, different UEs may wake up at the same or different times, and determine whether to transmit uplink data according to the monitoring results, that is, PUSCH, for the convenience of expression, here it is assumed that N=20;

Step 2: K UEs need to transmit data and transmit PUSCH to the base station, here it is assumed that K=2;

Step 3: the base station receives and demodulates the data transmitted by all K UEs;

Step 4: the base station forms a N×1 ACK/NACK-Inactive sequence [0,0,0,0,0,0,0,0,0,1,0,0,0,0,0,0,1,0,0, 0] corresponding to UE ID one by one according to the demodulation results, where 1 represents ACK, 0 represents NACK or UE in an inactive state; in addition, 1 may also be used to represent NACK or UE in an inactive state, 0 represents ACK, at this time, in order to reflect the sparsity of the ACK/NACK-Inactive sequence and facilitate compression, the original ACK/NACK-Inactive sequence may be performed by 0/1 flip first;

Step 5: the base station selects a trained parameter and/or structure of autoencoder based on the load level of the current network;

Step 6: the base station compresses the above-mentioned ACK/NACK-Inactive sequence based on the selected encoder in the autoencoder, and limits the coefficient and output of the autoencoder as binary 0, 1 bits to obtain the compressed M×1 binary vector [0,1,1,0,0,1, 0];

Step 7: the base station transmits the selected autoencoder model and the subscript of the parameters together with the compressed ACK/NACK-Inactive sequence to all UEs in a broadcast form.

Step 8: UE decompresses the received compressed M×1 ACK/NACK-Inactive sequence based on the trained decoder in the autoencoder notified by the base station, and finally outputs the decompressed sequence [0,0,0, 0,0,0,0,0,1,0,0,0,0,0,0,1,0,0,0] to obtain the ACK/NACK-Inactive bit corresponding to itself.

Embodiment 2: the ACK/NACK sequence in the PDSCH is compressed based on the autoencoder technology in machine learning.

1. Training

Step 1: the base station stores the ACK/NACK sequence transmitted by the UE in different channel states recently;

Step 2: the above-mentioned different channel states are grouped, and the training unit uses the ACK/NACK sequence transmitted by different UEs in the same group of channel states to train the autoencoder to be used until all the channel state groups are traversed, thereby obtaining machine learning models with different parameters corresponding to different channel states.

2. Storing and transferring models and parameters

Step 1: the training unit transfers the models and parameter sets of the encoders and decoders in the trained autoencoders in different groups of channel states to the storage unit of the base station;

Step 2: the base station configures the stored models and parameter sets of the decoders of the trained autoencoders in different groups of channel states to the UE through RRC signaling.

Step 3: steps 1-2 of training, and step 1-2 of storing and transferring the models and parameters are repeated, and the trained results are updated at regular intervals.

3. usage

Step 1: different serving cells in NR transmit PDSCH to UE;

Step 2: the UE receives and demodulates PDSCHs from different serving cells on different time slots;

Step 3: the UE forms, according to the demodulation result, a plurality of groups of ACK/NACK sequences corresponding to the PDSCHs of the above-mentioned different serving cells and different time slots, such as [1,1,0,0,1,1]; [1,1, 1,1,0,0]; [1,1,1,1] (for convenience, the length of the sequence is set to 16), here it is assumed that 1 represents ACK, 0 represents NACK, and it is assumed that there are two bits in each time slot corresponding to the ACK/NACK of a PDSCH, there are 3 serving cells in total, the first group of bits corresponds to the first serving cell, the second group of bits corresponds to the second serving cell, and the third group of bits corresponds to the third serving cell.

Step 4: when the channel condition is good, the 01 bit in the generated ACK/NACK codebook may be flipped, that is, 0 becomes 1, 1 becomes 0, and the above-mentioned three groups of sequences are concatenated to obtain the sequence [0,0,1,1,0,0,0,0,0,0,1,1,0,0,0,0]; when the channel condition is poor, the above-mentioned flip is unnecessary.

Step 5: the primary serving cell notifies the UE of the autoencoder model and parameter subscript for compression with other serving cells;

Step 6: UE compresses the above-mentioned ACK/NACK sequence based on the encoder of the autoencoder notified by the primary serving cell, and also limits the coefficient and output of the autoencoder as binary 0, 1 bits to obtain a compressed binary vector [1,0,1,1,0,0,0,1];

Step 7: UE feeds back the ACK/NACK sequence to the base station side;

Step 8: the base station side uses the autoencoder model and parameters notified by the primary serving cell to decompress the received compressed ACK/NACK sequence, and then obtains the bit-flipped ACK/NACK bit sequence [0,0,1,1,0,0,0,0,0,0,1,1,0,0,0,0], which becomes [1,1,0,0,1,1,1,1,1,1,0,0,1,1,1,1] after bit flipping.

In the above-mentioned embodiments of the present disclosure, machine learning technology is used to reduce the feedback overhead of 0/1 bit sequence with a sparsity, the specific embodiment includes but are not limited to: 1) reduce the overhead of ACK/NACK feedback of PUSCH in 6G ultra-large-scale machine communication with low complexity; and 2) reduce the overhead of the ACK/NACK sequence of PDSCH in the 6G ultra-high data rate with low complexity.

Based on the embodiment shown in FIG. 2 of the present disclosure, the method on the terminal side corresponds to the method on the network side, and the above-mentioned method on the network side is also applicable to the embodiment on the terminal side, and may also achieve the same technical effect.

Figure 5:
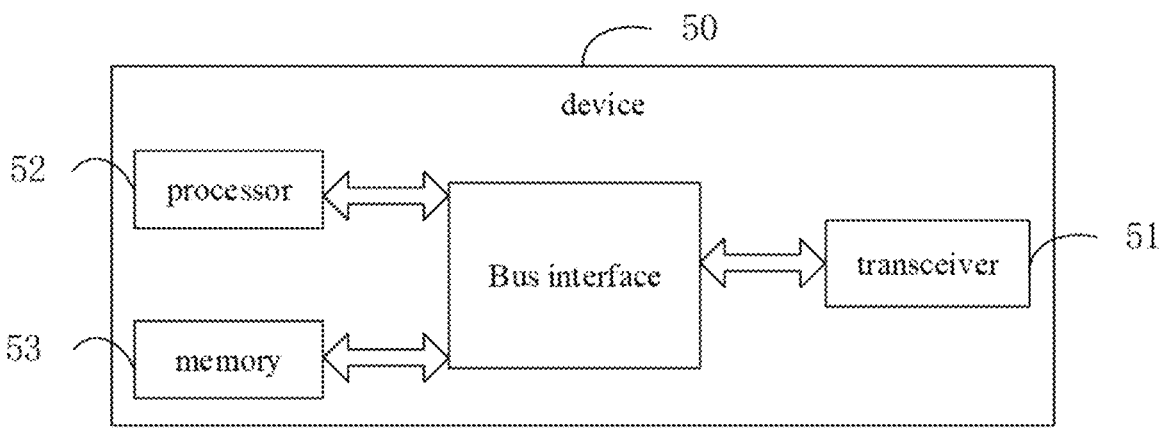
FIG. 5 is a schematic structural view of a data transmission device in the present disclosure.

As shown in FIG. 5, an embodiment of the present disclosure also provides a terminal 50, which includes: a transceiver 51, a processor 52, and a memory 53, where a program executable by the processor 52 is stored in the memory 53; when the processor 52 executes the program, the program may implement: obtaining ACK/NACK sequence to be fed back; selecting a machine learning model applied to the ACK/NACK sequence; compressing, through the machine learning model, the ACK/NACK sequence to obtain an indication sequence; and transmitting the indication sequence to the network device.

Optionally, the selecting, by the terminal, the machine learning model applied to the ACK/NACK sequence includes:

selecting, by the terminal, the machine learning model applied to the ACK/NACK sequence according to machine learning model indication information of the network device.

Optionally, the selecting, by the terminal, the machine learning model applied to the ACK/NACK sequence includes:

selecting, by the terminal, the machine learning model applied to the ACK/NACK sequence according to the ACK/NACK sequence.

Optionally, the terminal transmits indication information of the selected machine learning model applied to the ACK/NACK sequence to the network device.

Optionally, machine learning model indication information transmitted by the network device through radio resource control RRC signaling or medium access control control element MAC CE signaling or physical layer signaling is received.

Optionally, the transmitting, by the terminal, the indication sequence to the network device includes:

transmitting, by the terminal, the indication sequence to the network device on an uplink control channel or an uplink shared channel.

Optionally, the data transmission method further includes:

transmitting, by the terminal, the indication sequence and indication information of the machine learning model corresponding to the indication sequence to the network device on an uplink shared channel or an uplink control channel.

Optionally, the data transmission method further includes:

transmitting, by the terminal, the indication sequence and indication information of the machine learning model corresponding to the indication sequence to the network device on an uplink shared channel and an uplink control channel respectively, or on the uplink control channel and the uplink shared channel respectively.

Optionally, the machine learning model indication information is transmitted by one or all of the network devices.

Optionally, the training process and distributing process for the machine learning model further include:

being performed by one or all of the network devices; and being repeated once every fixed cycle.

Optionally, the machine learning model is trained and distributed by the following process:

obtaining, by the terminal, the ACK/NACK sequence to be fed back;

storing, by the terminal, the ACK/NACK sequence;

grouping, by the terminal, the stored ACK/NACK sequence, performing machine learning model training, generating a plurality of groups of machine learning models, and reporting the plurality of groups of machine learning models to the network device.

Optionally, the reporting, by the terminal, the trained model to the network device through the following process:

reporting, by the terminal, the trained machine learning model to the network device through RRC signaling or MAC CE or physical layer signaling.

It should be noted that the device in this embodiment is a device corresponding to the method shown in FIG. 1 above, and the implementation methods in the above-mentioned embodiments are all applicable to the embodiment of the device, and can also achieve the same technical effect. In this device, the transceiver 51 and the memory 53, and the transceiver 51 and the processor 52 may be electrically connected through the bus interface, the function of the processor 52 may also be realized by the transceiver 51, and the function of the transceiver 51 may also be realized by the processor 52. It should be noted here that the above-mentioned device provided by the embodiments of the present disclosure can realize all the method steps realized by the above-mentioned method embodiments, and can achieve the same technical effect. Parts and beneficial effects in this embodiment that are the same as those in the method embodiment will not be described in detail here.

Figure 6:
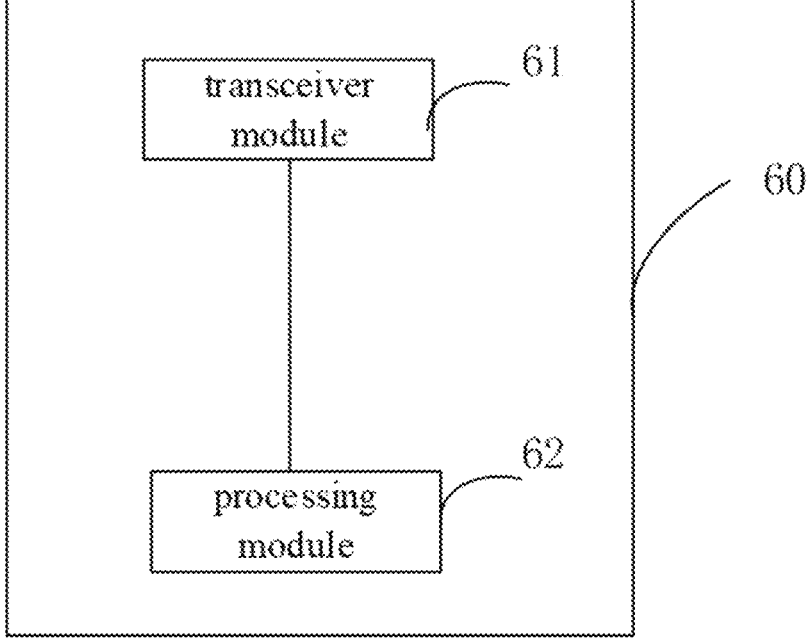
FIG. 6 is a block schematic view of a data transmission apparatus in the present disclosure.

As shown in FIG. 6, an embodiment of the present disclosure also provides a data transmission apparatus 60, which includes:

a transceiver module 61, configured to obtain ACK/NACK sequence to be fed back;

a processing module 62, configured to select a machine learning model applied to the ACK/NACK sequence; compress, through the machine learning model, the ACK/NACK sequence to obtain an indication sequence;

where the transceiver module 61 is further configured to transmit the indication sequence to a network device.

Optionally, the selecting, by the terminal, the machine learning model applied to the ACK/NACK sequence includes:

selecting, by the terminal, the machine learning model applied to the ACK/NACK sequence according to machine learning model indication information of the network device.

Optionally, the selecting, by the terminal, the machine learning model applied to the ACK/NACK sequence includes:

selecting, by the terminal, the machine learning model applied to the ACK/NACK sequence according to the ACK/NACK sequence.

Optionally, the terminal transmits indication information of the selected machine learning model applied to the ACK/NACK sequence to the network device.

Optionally, machine learning model indication information transmitted by the network device through radio resource control RRC signaling or medium access control control element MAC CE signaling or physical layer signaling is received.

Optionally, the transmitting, by the terminal, the indication sequence to the network device includes:

transmitting, by the terminal, the indication sequence to the network device on an uplink control channel or an uplink shared channel.

Optionally, the data transmission method further includes:

transmitting, by the terminal, the indication sequence and indication information of the machine learning model corresponding to the indication sequence to the network device on an uplink shared channel or an uplink control channel.

Optionally, the data transmission method further includes:

transmitting, by the terminal, the indication sequence and indication information of the machine learning model corresponding to the indication sequence to the network device on an uplink shared channel and an uplink control channel respectively, or on the uplink control channel and the uplink shared channel respectively.

Optionally, the machine learning model indication information is transmitted by one or all of the network devices.

Optionally, training process and distributing process for the machine learning model further include:

being performed by one or all of the network devices; and being repeated once every fixed cycle.

Optionally, the machine learning model is trained and distributed by the following process:

obtaining, by the terminal, the ACK/NACK sequence to be fed back;

storing, by the terminal, the ACK/NACK sequence;

grouping, by the terminal, the stored ACK/NACK sequence, performing machine learning model training, generating a plurality of groups of machine learning models, and reporting the plurality of groups of machine learning models to the network device.

Optionally, the reporting, by the terminal, the trained model to the network device through the following process:

reporting, by the terminal, the trained machine learning model to the network device through RRC signaling or MAC CE or physical layer signaling.

It should be noted that the apparatus in this embodiment is an apparatus corresponding to the method shown in FIG. 1 above, and the implementations in the above embodiments are all applicable to the embodiments of the apparatus, and can also achieve the same technical effect. What needs to be explained here is that the above-mentioned apparatus provided by the embodiment of the present disclosure can realize all the method steps realized by the above-mentioned method embodiments, and can achieve the same technical effect. Parts and beneficial effects in this embodiment that are the same as those in the method embodiment will not be described in detail here.

The embodiment of the present disclosure also provides a network device, which includes: a transceiver, a processor, and a memory, where a program executable by the processor is stored in the memory; the program, when executed by the processor, implements: obtaining ACK/NACK sequence to be trained, and storing the ACK/NACK sequence to be trained; grouping the stored ACK/NACK sequence, performing machine learning model training, and generating a plurality of groups of machine learning models; storing the machine learning model; distributing the stored machine learning model to the terminal through RRC signaling or MAC CE or physical layer signaling.

Optionally, training process and distributing process for the machine learning model further include: being performed by one or all of the network devices; and being repeated once every fixed cycle.

Optionally, the storage module stores the machine learning model reported by the terminal;

the transceiver module is configured to distribute the stored machine learning models of all different terminals to the terminals through RRC signaling or MAC CE or physical layer signaling.

Optionally, the stored ACK/NACK sequence is grouped according to a sequence length and an ACK ratio.

All the implementation manners in the foregoing method embodiments are applicable to the embodiment, and can also achieve the same technical effect.

The embodiment of the present disclosure also provides a training and distributing apparatus of machine learning model, which is applied to the network device side, and the apparatus includes:

a transceiver module, configured to obtain ACK/NACK sequence to be trained, and store the ACK/NACK sequence to be trained;

a processing module, configured to group the stored ACK/NACK sequence, perform machine learning model training, and generate a plurality of groups of machine learning models;

a storage module, configured to store the machine learning models;

where the transceiver module is configured to distribute the stored machine learning models to the terminals through RRC signaling or MAC CE or physical layer signaling.

Optionally, training process and distributing process for the machine learning model further include:

being performed by one or all of the network devices; and being repeated once every fixed cycle.

Optionally, the storage module stores the machine learning model reported by the terminal;

the transceiver module is configured to distribute the stored machine learning models of all different terminals to the terminals through RRC signaling or MAC CE or physical layer signaling.

Optionally, the stored ACK/NACK sequence is grouped according to a sequence length and an ACK ratio.

All the implementation manners in the foregoing method embodiments are applicable to this embodiment, and can also achieve the same technical effect.

The embodiment of the present disclosure also provides a network device, which includes: a transceiver, a processor, and a memory, where a program executable by the processor is stored in the memory; the program, when executed by the processor, implements: obtaining ACK/NACK sequence to be fed back; selecting a machine learning model applied to the ACK/NACK sequence, and transmitting indication information of the selected machine learning model to the terminal; compressing, through the machine learning model, the ACK/NACK sequence to obtain an indication sequence; and transmitting the indication sequence to the terminal.

Optionally, the network device transmits the machine learning model indication information to the terminal through radio resource control RRC signaling or medium access control control element MAC CE signaling or physical layer signaling.

Optionally, one or all network devices transmits the machine learning model indication information to the terminal.

Optionally, the machine learning model is trained and distributed by the following process:

obtaining, by the network device, the ACK/NACK sequence to be fed back; and storing the ACK/NACK sequence to be fed back;

grouping, by the network device, the stored ACK/NACK sequence, performing machine learning model training, and generating a plurality of groups of machine learning models;

storing, by the network device, the machine learning models;

distributing, by the network device, the stored training machine learning models to the terminals through RRC signaling or MAC CE or physical layer signaling.

Optionally, the machine learning model training process and distributing process further include:

being performed by one or all of the network devices; and being repeated once every fixed cycle.

Optionally, the terminal reports the trained model to the network device through the following process:

reporting, by the terminal, the trained machine learning model to the network device through RRC signaling or MAC CE or physical layer signaling.

Optionally, the stored ACK/NACK sequence is grouped according to a sequence length and an ACK ratio.

Optionally, the transmitting the indication sequence to the terminal includes:

transmitting, by the network device, the indication sequence and indication information of the machine learning model corresponding to the indication sequence to the terminal together on a downlink shared channel or a downlink control channel; or, transmitting, by the network device, the indication sequence and indication information of the machine learning model corresponding to the indication sequence to the terminal on the downlink shared channel and the downlink control channel respectively, or on the downlink control channel and the downlink shared channel respectively; or, transmitting, by the network device, only the indication sequence to the terminal on the downlink control channel or the downlink shared channel.

It should be noted that the device in this embodiment is a device corresponding to the method shown in FIG. 2 above, and the implementations in the above embodiments are all applicable to the embodiments of the device, and can also achieve the same technical effect. In the device, the transceiver and the memory, as well as the transceiver and the processor may be electrically connected through the bus interface, and the functions of the processor may also be realized by the transceiver, and the functions of the transceiver may also be realized by the processor. What needs to be explained here is that the above-mentioned device provided by the embodiment of the present disclosure can realize all the method steps realized by the above-mentioned method embodiments, and can achieve the same technical effect. Parts and beneficial effects in this embodiment that are the same as those in the method embodiment will not be described in detail here.

The embodiment of the present disclosure also provides a data transmission apparatus, which includes:

a transceiver module, configured to obtain the ACK/NACK sequence to be fed back;

a processing module, configured to select the machine learning model applied to the ACK/NACK sequence, and transmit indication information of the selected machine learning model to the terminal; compress, through the machine learning model, the ACK/NACK sequence to obtain an indication sequence;

where the transceiver module is also configured to transmit the indication sequence to the terminal.

Optionally, the transceiver module transmits the machine learning model indication information to the terminal through radio resource control RRC signaling or medium access control control element MAC CE signaling or physical layer signaling.

Optionally, one or all network devices transmit the machine learning model indication information to the terminal.

Optionally, the machine learning model is trained and distributed by the following process:

obtaining, by the processing module, the ACK/NACK sequence to be fed back; and storing the ACK/NACK sequence to be fed back;

grouping, by the processing module, the stored ACK/NACK sequence, performing machine learning model training, and generating a plurality of groups of machine learning models;

storing, by the processing module, the machine learning models;

distributing, by the processing module, the stored training machine learning models to the terminals through RRC signaling or MAC CE or physical layer signaling.

Optionally, the machine learning model training process and distributing process further include:

being performed by one or all of the network devices; and being repeated once every fixed cycle.

Optionally, the terminal reports the trained model to the network device through the following process:

reporting, by the terminal, the trained machine learning model to the network device through RRC signaling or MAC CE or physical layer signaling.

Optionally, the stored ACK/NACK sequence is grouped according to a sequence length and an ACK ratio.

Optionally, the transmitting the indication sequence to the terminal includes:

transmitting the indication sequence and indication information of the machine learning model corresponding to the indication sequence to the terminal on a downlink shared channel or a downlink control channel; or, transmitting the indication sequence and indication information of the machine learning model corresponding to the indication sequence to the terminal on the downlink shared channel and the downlink control channel respectively, or on the downlink control channel and the downlink shared channel respectively; or, transmitting only the indication sequence to the terminal on the downlink control channel or the downlink shared channel.

It should be noted that the apparatus in this embodiment is an apparatus corresponding to the method shown in FIG. 2 above, and the implementations in the above embodiments are all applicable to the embodiments of the apparatus, and can also achieve the same technical effect. What needs to be explained here is that the above-mentioned apparatus provided by the embodiment of the present disclosure can realize all the method steps realized by the above-mentioned method embodiments, and can achieve the same technical effect. Parts and beneficial effects in this embodiment that are the same as those in the method embodiment will not be described in detail here.

The embodiment of the present disclosure further provides a data transmission system, which includes: the device on the network side and the device on the terminal side as described in the above-mentioned embodiments.

It should be noted that all the implementation manners in the foregoing embodiments are applicable to the embodiments of the system, and can also achieve the same technical effect.

The embodiment of the present disclosure also provides a processor-readable storage medium, where the processor-readable storage medium stores processor-executable instructions, and the processor-executable instructions are used to enable the processor to perform the above-mentioned methods. All the implementation manners in the foregoing method embodiments are applicable to the embodiments, and can also achieve the same technical effect.

Those skilled ordinarily in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Skilled artisans may implement the described functionality through different methods for each particular application, but such implementation should not be considered beyond the scope of the present disclosure.

Those skilled in the art can clearly understand that for the convenience and brevity of the description, the specific working process of the above-described system, apparatus and unit can refer to the corresponding process in the foregoing method embodiment, which will not be repeated here.

In the embodiments provided in the present disclosure, it should be understood that the disclosed devices and methods may be implemented in other ways. For example, the apparatus embodiments described above are only illustrative. For example, the division of the units is only a logical function division. In actual implementation, there may be other division methods. For example, multiple units or components can be combined or may be integrated into another system, or some features may be ignored, or not implemented. In another point, the mutual coupling or direct coupling or communication connection shown or discussed may be achieved through some interfaces, and the indirect coupling or communication connection of apparatuses or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present disclosure may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the essence of the technical solution of the present disclosure or the part that contributes to the related technology or the part of the technical solution may be embodied in the form of a software product. The computer software product is stored in a storage medium, and includes several instructions to enable a computer device (which may be a personal computer, server, or network device, etc.) to execute all or part of the steps of the methods described in various embodiments of the present disclosure. The aforementioned storage medium includes: U disk, mobile hard disk, read-only memory (read-only memory, ROM), random access memory (random access memory, RAM), magnetic disk or optical disk, and various media that can store program codes.

In addition, it should be pointed out that, in the apparatus and method of the present disclosure, obviously, each component or each step can be decomposed and/or reassembled. These decompositions and/or recombinations should be considered as equivalents of the present disclosure. Also, the steps for executing the above series of processes can naturally be executed in chronological order according to the illustrated order, but they are not necessarily executed in chronological order, and some steps can be executed in parallel or independently with each other. For those ordinarily skilled in the art, it can be understood that all or any steps or components of the methods and apparatuses of the present disclosure may be implemented in any computing apparatus (including processors, storage media, etc.) or networks of computing devices in hardware, firmware, software or a combination thereof, which can be realized by those skilled in the art by using their basic programming skills after reading the description of the present disclosure.

It should be understood that the embodiments described in the embodiments of the present disclosure may be implemented by hardware, software, firmware, middleware, microcode or a combination thereof. For hardware implementation, modules, units, and subunits can be implemented in one or more application specific integrated circuits (Application Specific Integrated Circuits, ASIC), digital signal processor (Digital Signal Processor, DSP), digital signal processing device (DSP Device, DSPD), Programmable Logic Device (Programmable Logic Device, PLD), Field-Programmable Gate Array (Field-Programmable Gate Array, FPGA), general-purpose processor, controller, microcontroller, microprocessor, and other electronic units or combinations thereof used for performing the functions described in the present disclosure.

For software implementation, the technologies described in the embodiments of the present disclosure may be implemented through modules (such as procedures, functions, etc.) that execute the functions described in the embodiments of the present disclosure. Software codes can be stored in memory and executed by a processor. Memory can be implemented within the processor or external to the processor.

Therefore, the object of the present disclosure can also be achieved by running a program or a group of programs on any computing apparatus. The computing apparatus may be a known general-purpose apparatus. Therefore, the object of the present disclosure can also be achieved only by providing a program product including program codes for realizing the method or apparatus. That is, such a program product also constitutes the present disclosure, and a storage medium storing such a program product also constitutes the present disclosure. Obviously, the storage medium may be any known storage medium or any storage medium developed in the future. It should also be pointed out that, in the apparatus and method of the present disclosure, obviously, each component or each step can be decomposed and/or reassembled. These decompositions and/or recombinations should be considered equivalents of the present disclosure. Also, the steps for performing the above-mentioned series of processes may naturally be performed in chronological order in the order described, but need not necessarily be performed in chronological order. Certain steps may be performed in parallel or independently with each other.

What have been described above are optional embodiments of the present disclosure. It should be pointed out that those ordinarily skilled in the art can make some improvements and modifications without departing from the principles described in the present disclosure. These improvements and modifications are also within the protection scope of the present disclosure.

What is claimed is:

1. A data transmission method, performed by a terminal, comprising:
obtaining, by the terminal, an acknowledgment/negative acknowledgment ACK/NACK sequence to be fed back;
selecting, by the terminal, a machine learning model applied to the ACK/NACK sequence, wherein the machine learning model comprises an autoencoder;
compressing, by the terminal, the ACK/NACK sequence through the machine learning model to obtain an indication sequence; and
transmitting, by the terminal, the indication sequence to a network device.

2. The data transmission method according to claim 1, wherein the selecting, by the terminal, the machine learning model applied to the ACK/NACK sequence comprises:
selecting, by the terminal, the machine learning model applied to the ACK/NACK sequence according to machine learning model indication information of the network device.

3. The data transmission method according to claim 1, wherein the selecting, by the terminal, the machine learning model applied to the ACK/NACK sequence comprises:
selecting, by the terminal, the machine learning model applied to the ACK/NACK sequence according to the ACK/NACK sequence;
wherein the method further comprises:
transmitting, by the terminal, indication information of the selected machine learning model applied to the ACK/NACK sequence to the network device.

4. The data transmission method according to claim 1, wherein the transmitting, by the terminal, the indication sequence to the network device comprises:
transmitting, by the terminal, the indication sequence to the network device on an uplink control channel or an uplink shared channel;
wherein the machine learning model indication information is transmitted by one or all of the network devices.

5. The data transmission method according to claim 3, further comprising:
transmitting, by the terminal, the indication sequence and indication information of the machine learning model corresponding to the indication sequence to the network device together on an uplink shared channel or an uplink control channel;
or
the method further comprises:
transmitting, by the terminal, the indication sequence and indication information of the machine learning model corresponding to the indication sequence to the network device on an uplink shared channel and an uplink control channel respectively or on an uplink control channel and an uplink shared channel respectively.

6. The data transmission method according to claim 1, further comprising:
receiving, by the terminal, machine learning model indication information transmitted by the network device through a radio resource control (RRC) signaling or a medium access control control element (MAC CE) signaling or a physical layer signaling.

7. The data transmission method according to claim 1, wherein the machine learning model is trained and distributed by:
obtaining, by the terminal, the ACK/NACK sequence to be fed back;
storing, by the terminal, the ACK/NACK sequence;
grouping, by the terminal, the stored ACK/NACK sequence, performing a machine learning model training, generating a plurality of groups of machine learning models, and reporting the plurality of groups of machine learning models to the network device;
wherein the reporting, by the terminal, the trained model to the network device through the following process:
reporting, by the terminal, the trained machine learning model to the network device through an RRC signaling or an MAC CE or a physical layer signaling.

8. A training and distributing method of machine learning model, performed by a network device side, comprising:
obtaining, by the network device, an ACK/NACK sequence to be trained, and storing the ACK/NACK sequence to be trained;
grouping, by the network device, the stored ACK/NACK sequence, performing machine learning model training, and generating a plurality of groups of machine learning models, wherein the machine learning models comprise an autoencoder;
storing, by the network device, the machine learning models;
distributing, by the network device, the stored machine learning models to the terminals through an RRC signaling or an MAC CE or a physical layer signaling.

9. The training and distributing method of the machine learning model according to claim 8, wherein a training process and a distributing process for the machine learning model further comprise:
being performed by one or all of the network devices;
being repeated once every fixed cycle.

10. The training and distributing method of the machine learning model according to claim 8, further comprising:
storing, by the network device, machine learning models reported by the terminals;
distributing, by the network device, the stored machine learning models of all different terminals to the terminals through the RRC signaling or the MAC CE or the physical layer signaling;
the stored ACK/NACK sequence is grouped according to a sequence length and an ACK ratio.

11. A data transmission method, performed by a network device, comprising:
obtaining, by the network device, an acknowledgment/negative acknowledgment ACK/NACK sequence to be fed back;
selecting, by the network device, a machine learning model applied to the ACK/NACK sequence, and transmitting indication information of the selected machine learning model to a terminal, wherein the machine learning model comprises an autoencoder;
compressing, by the network device, the ACK/NACK sequence through the machine learning model to obtain an indication sequence; and
transmitting, by the network device, the indication sequence to the terminal.

12. The data transmission method according to claim 11, further comprising:

transmitting, by the network device, machine learning model indication information to the terminal through a radio resource control (RRC) signaling or a medium access control control element (MAC CE) signaling or a physical layer signaling.

13. The data transmission method according to claim 11, wherein the machine learning model is trained and distributed by:

obtaining, by the network device, the ACK/NACK sequence to be fed back;

storing, by the network device, the ACK/NACK sequence;

grouping, by the network device, the stored ACK/NACK sequence, performing a machine learning model training, and generating a plurality of groups of machine learning models;

storing, by the network device, the machine learning models;

distributing, by the network device, the stored training machine learning models to the terminals through a RRC signaling or an MAC CE or a physical layer signaling.

14. The data transmission method according to claim 13, wherein a training process and a distributing process for the machine learning model:

being repeated once every fixed cycle;

the stored ACK/NACK sequence is grouped according to a sequence length and an ACK ratio.

15. The data transmission method according to claim 11, further comprising:

transmitting, by the network device, the indication sequence and indication information of the machine learning model corresponding to the indication sequence to the terminal together on a downlink shared channel or a downlink control channel; or, transmitting, by the network device, the indication sequence and indication information of the machine learning model corresponding to the indication sequence to the terminal on the downlink shared channel and the downlink control channel respectively, or on the downlink control channel and the downlink shared channel respectively.

16. A data transmission device, comprising: a transceiver, a processor, and a memory, wherein a program executable by the processor is stored in the memory; and the program, when executed by the processor, implements the data transmission method according to claim 1.

17. The data transmission device according to claim 16, wherein the processor obtains the ACK/NACK sequence to be fed back; the memory stores the ACK/NACK sequence; the processor groups the stored ACK/NACK sequence, performs a machine learning model training, and generates a plurality of groups of machine learning models, and the transceiver reports the plurality of groups of machine learning models to the network device.

18. A data transmission device, comprising: a transceiver, a processor, and a memory, wherein a program executable by the processor is stored in the memory; and the program, when executed by the processor, implements the data transmission method according to claim 11.

19. The data transmission device according to claim 18, wherein the processor obtains the ACK/NACK sequence to be trained; the memory stores the ACK/NACK sequence; the processor groups the stored ACK/NACK sequence, performs machine learning model training, and generates a plurality of groups of machine learning models; the memory stores the machine learning models; the transceiver distributes the stored training machine learning models to the terminals through a RRC signaling or an MAC CE or a physical layer signaling.

20. A network device, comprising: a transceiver, a processor, and a memory, wherein a program executable by the processor is stored in the memory; and the program, when executed by the processor, implements the training and distributing method of machine learning model according to claim 8.

\* \* \* \* \*